T. F. PERKINS.
MEANS FOR UTILIZING ELECTRICAL ENERGY.
APPLICATION FILED AUG. 15, 1908.
928,214.
Patented July 13, 1909.
2 SHEETS—SHEET 2.
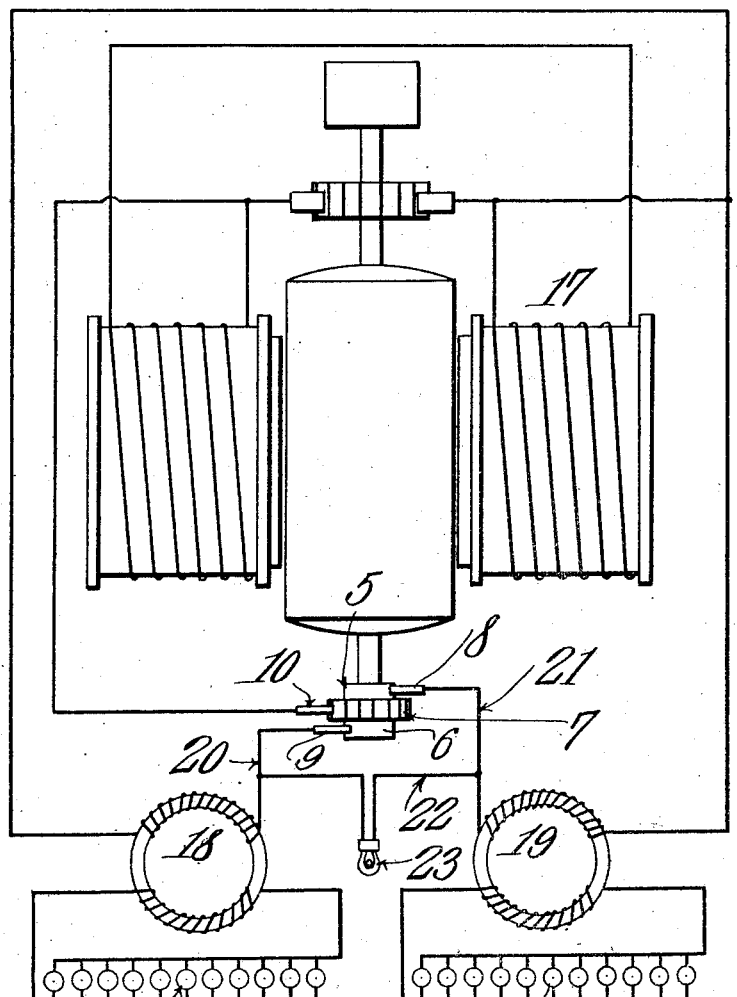
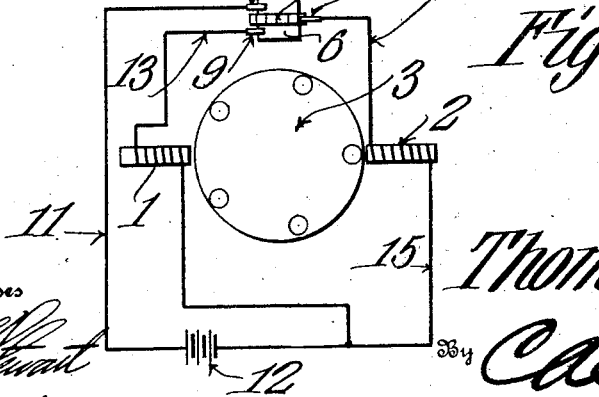

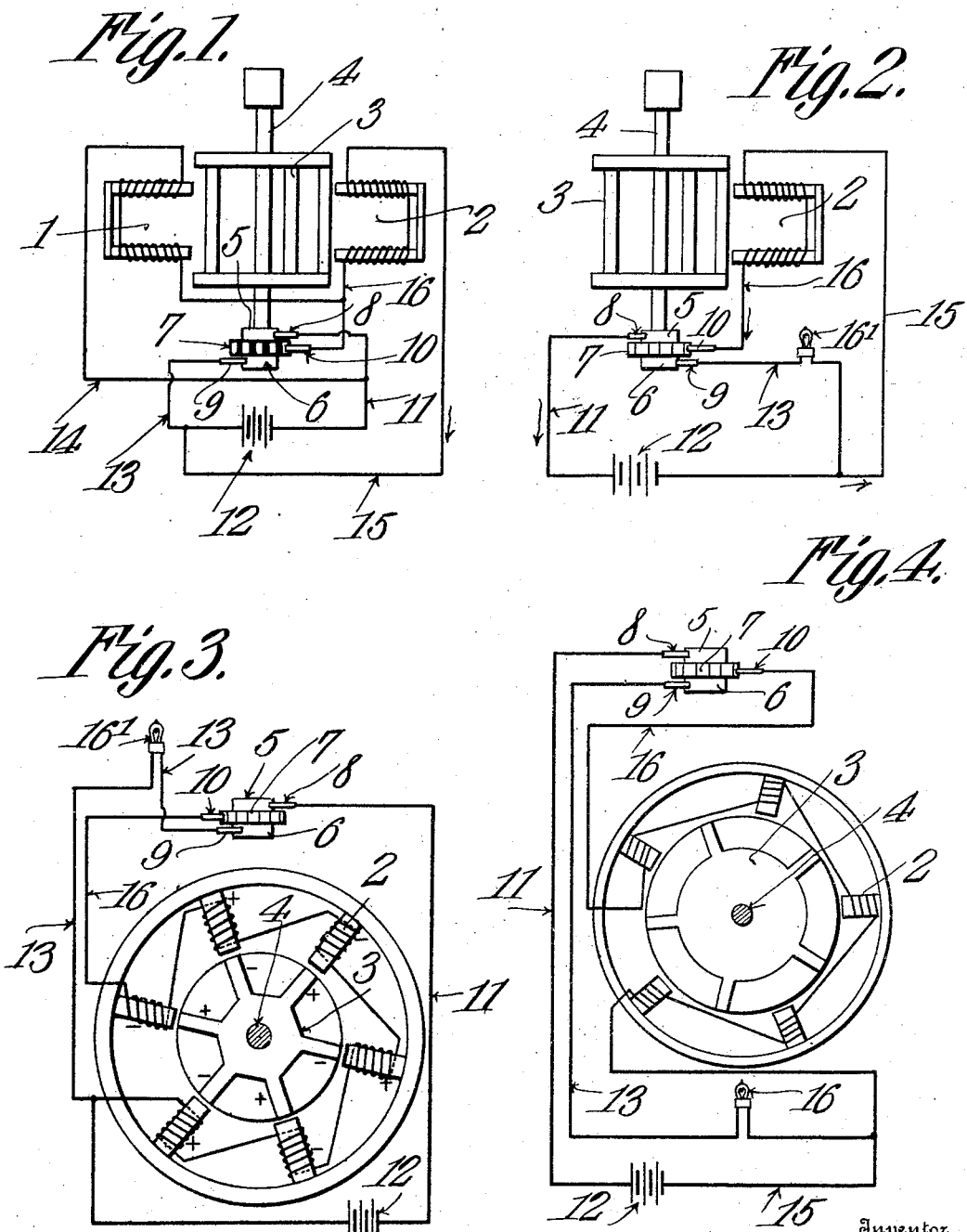

UNITED STATES PATENT OFFICE.

THOMAS F. PERKINS, OF ATLANTA, TEXAS.

MEANS FOR UTILIZING ELECTRICAL ENERGY.

No. 928,214.   Specification of Letters Patent.   Patented July 13, 1909.

Original application filed March 1, 1907, Serial No. 359,984. Divided and this application filed August 15, 1908.
Serial No. 448,719.

*To all whom it may concern:*

Be it known that I, THOMAS F. PERKINS, a citizen of the United States, residing at Atlanta, in the county of Cass and State of Texas, have invented a new and useful Means for Utilizing Electrical Energy, of which the following is a specification.

This invention has reference to improvements in means for utilizing electrical energy and its object is primarily to utilize in useful work electrical energy which has heretofore been to a great extent wasted or dissipated.

This application is a division of an application, Serial No. 359,984, filed by me on March 1, 1907, and the present invention consists in means for utilizing the extra current generated by the break in the circuit of an electro magnetic apparatus having a commutator so that such current will charge a circuit containing translating devices responsive to the energy of the said extra current.

The invention will be best understood from the following detail description taken in connection with the accompanying drawings, forming a part of this specification, in which drawings—

Figure 1 is a diagrammatic representation of a means for utilizing the extra current, in accordance with the present invention, said means being electro magnetic. Figs. 2, 3 and 4 are diagrammatic representations of means for carrying out the invention wherein the extra current is converted into radiant energy. Fig. 5 is a diagrammatic representation of a means for carrying out the invention where the extra current is utilized for the purpose of doing mechanical work. Fig. 6 is a diagrammatic representation showing the application of the invention to a distributing system.

The present invention is based upon the fact that when a charged electric circuit containing electro magnetic translating devices is broken, there is an extra current produced due to the self induction of the current. Such currents are usually manifested in a commutator in the form of sparks and various expedients have been proposed to reduce or obliterate sparking. The energy of this extra current has been usually allowed to dissipate without doing any useful work. By the present invention the energy of such extra current is utilized for the production of either mechanical energy or radiant energy.

In Fig. 1 there is shown a simple type of motor wherein there are indicated two field magnets 1 and 2, in operative relation to an armature 3 mounted upon an armature shaft 4. Mounted upon the shaft 4 is a commutator consisting of two plain rings 5—6 each provided on one edge or face with teeth or plates 7 which may project to a greater distance from the axis of the shaft than does the active face of either of the rings 5 and 6. The teeth 7 of one ring engage between the teeth 7 of the other ring, and both the rings and teeth are insulated from each other and from the shaft. This is a known form of commutator and needs no special description or illustration. Bearing upon the ring 5 is a brush 8, and bearing upon the ring 6 is a brush 9, and in the path of the teeth 7 of both rings is a brush 10. In the structure shown in Fig. 1, the brush 8 is connected by a conductor 11 to one side of a battery 12 or other source of electrical energy, and the brush 9 is connected by a conductor 13 to the other side of said battery 12. That side of the battery which is connected to the brush 8 is also connected by a branch conductor 14 to one terminal of the field magnet 1, and that side of the battery which is connected to the brush 9 is also connected by a branch conductor 15 to one side of the field magnet 2. The other terminals of both field magnets are connected by a common conductor 16 to the brush 10.

If it be assumed that the brush 10 is upon a tooth or segment connected to the ring 5, then the current will flow from the battery 12 through the conductor 11 to the brush 8, and by the brush 10 and conductor 16 to the magnet 2 and returning by the conductor 15 to the other side of the battery 12. Under these circumstances the magnet 1 is in a dead loop so far as the battery 12 is concerned. However, a circuit may be traced from the battery 12 by the conductor 14 through the magnet 1 thence to the magnet 2 and by conductor 15 back to the other side of the battery, but the high resistance of the two magnets in series will prevent any material current from flowing in this circuit as compared to the low resistance circuit through the magnet 2 and the commutator ring 5. Now upon the break of the circuit there is generated a high tension current capable of readily overcoming the resistance of the two magnets in series and this extra current will flow through said magnets and energize both of them, the current flowing to the magnet 2 in the same direction as before. There is therefore an energization of both magnets due to the extra current which is converted into useful work in a rotary movement produced upon the armature. The extra current is therefore not dissipated and thereby lost for any useful purpose but is converted into mechanical energy which may be utilized in any desired way.

In Fig. 2, the field magnet 2 only is shown. In this case the brush 8 is connected by the conductor 11 to the opposite side of the battery 12 to that shown in Fig. 1 and the conductor 15 is also oppositely connected to the battery 12 from that shown in Fig. 1. Furthermore, the brush 9 is connected by the conductor 13 to the same side of the battery as is the conductor 15, but in the conductor 13 is included an electric lamp 16 preferably of the incandescent type, and which may be taken as indicative of any number of lamps or as indicative of any non-inductive type of translating device. Let it again be assumed that the brushes 8 and 10 are coupled by the commutator. By this means the magnet 2 is energized in the usual way by the battery 12. At the break of the circuit of the battery 12 there is established another circuit from the magnet 2 through the conductor 16 and brush 10, to the brush 9, thence by a conductor 13 to conductor 15 and back to the magnet. This forms a path for the extra current and this path includes the lamp 16. Now in practice it is found that each time the circuit is broken the lamp 16 will glow, and when the motor is rotated at sufficient speed the glowing of the lamp becomes practically continuous so far as its appearance to the eye is concerned. With the structure of Fig. 2, the extra current is converted into radiant energy.

In the structure of Fig. 3 practically the same result as that of Fig. 2 occurs except that a somewhat more complex type of motor is shown wherein there is a series of active field magnets 2, and the armature is made up of a number of radial arms, while the whole structure may be built of lamina after the modern approved practice.

In Fig. 4 the armature instead of being a plain iron armature either solid or laminated, may be of the electro magnetic type as indicated.

In Fig. 5 an extra field magnet 1 is included in circuit with the brush 9 and the battery 12 is entirely cut out of circuit whenever the brushes 9 and 10 are coupled up in circuit, so that the extra current finds the path through the field magnet 1 and thus energizes it to act upon the armature 3 at the proper instant.

In Fig. 6, there is shown a dynamo or generator 17 and the leads from this generator are carried to the primaries of two induction coils 18 and 19 and to the brush 10 of the commutator respectively. The brush 9 is connected by a lead 20 to one terminal of the primary of the coil 18 and the brush 8 is connected by a lead 21 to one terminal of the primary of the converter 19. Bridged across the conductors 20 and 21 is another conductor 22 containing a lamp 23 in series, and this lamp may be taken as indicative of any type of non-inductive device. The secondaries of the converters 18 and 19 are shown as feeding series of lamps 24, it being understood that these lamps are indicative of any form of translating device, whether of the inductive or non-inductive type.

In the arrangement shown in Fig. 6, the brush 10 bridges the space between the teeth 7 and there is a break in the circuit each time the brush 10 passes from the tooth of the ring 5 to the next tooth of the ring 6. The converters 18 and 19 and the circuits including these converters, and the conductor 22 and lamp 23 provide a path for the extra current produced by the break of the main circuit, and this extra current is utilized in the production of radiant energy at the lamp 23.

What is claimed is:—

1. A means for utilizing electrical energy comprising a charged circuit including inductive translating devices, another circuit containing translating devices capable of utilizing electrical energy for the production of useful work and rendered active by the extra current produced by a break in the first named circuit, and means for closing and opening the first named circuit in continuous succession, and on the break in said circuit closing the second circuit to the exclusion of the charging source of the first named circuit.

2. A means for utilizing electrical energy, comprising a charged electric circuit, an inductive translating device included therein, another electric circuit including a translating device capable of producing useful work, and means for breaking the first named circuit and simultaneously completing the second circuit to the exclusion of the charging source of the first circuit.

3. A means for utilizing electrical energy, comprising an electro magnetic translating device, a source of current, an electric circuit including said translating device and source of current, another circuit including the same electro magnetic translating device, and a non-inductive translating device, and a commutator for intermittently breaking the first named circuit and during the period of break completing the second circuit to the exclusion of the said source of current.

In testimony that I claim the foregoing as my own, I have hereto affixed my signature in the presence of two witnesses.

THOMAS F. PERKINS.

Witnesses:
G. W. GREENE,
LEO ILES.